United States Patent [19]

Hershey

[11] Patent Number: 5,611,171
[45] Date of Patent: Mar. 18, 1997

[54] MULTIPLE-CATCH MOUSE TRAP

[76] Inventor: Michael D. Hershey, P.O. Box 55, 15221 Plymouth, Thompsonville, Mich. 49683

[21] Appl. No.: 605,847

[22] Filed: Feb. 26, 1996

[51] Int. Cl.⁶ ............................................. A01M 23/08
[52] U.S. Cl. ............................................. 43/66; 43/64
[58] Field of Search ................................. 43/61, 60, 64, 43/65, 66

[56] References Cited

U.S. PATENT DOCUMENTS

| | | | |
|---|---|---|---|
| 538,118 | 4/1895 | Olivos | 43/66 |
| 709,395 | 9/1902 | Cook, Sr. | 43/66 |
| 729,786 | 6/1903 | McDaniel | 43/66 |
| 956,138 | 4/1910 | McAleer | 43/65 |
| 1,040,329 | 9/1912 | Holt | 43/65 |
| 1,163,071 | 12/1915 | Drum | 43/64 |
| 1,168,252 | 1/1916 | Erdley | 43/65 |
| 1,618,513 | 2/1927 | Coghill | 43/66 |
| 1,667,048 | 4/1928 | Rawlings | 43/64 |
| 1,716,196 | 6/1929 | Swanson | 43/65 |
| 2,126,512 | 8/1938 | Stemen | 43/65 |
| 2,162,623 | 6/1939 | Livingston | 43/65 |
| 3,872,619 | 3/1975 | McIlwain | 43/60 |
| 4,214,399 | 7/1980 | Bradley | 43/66 |

FOREIGN PATENT DOCUMENTS

| | | | |
|---|---|---|---|
| 3442673 | 5/1986 | Germany | 43/60 |
| 446275 | 4/1936 | United Kingdom | 43/66 |

*Primary Examiner*—J. Elpel

[57] ABSTRACT

A lid (2), with a plurality of open entrance aperture tubes (8) combined with similar apertures possessing one way passage devices (16) and a bait compartment (18) to induce mice and the like to pass through the one way passage device; adapted for use with a variety of standard commercial containers, such as five gallon plastic buckets, oil drums, and trash cans, containing additional bait and captured mice.

4 Claims, 5 Drawing Sheets

MULTIPLE-CATCH MOUSE TRAP

BACKGROUND

1. Field of Invention

This invention relates to the trapping of a multiplicity of live mice.

2. Description of Prior Art

Catching rodents in considerable quantities, without the necessity of recharging bait, resetting traps, or handling rodents has been the focus of much of the prior art. A successful mouse trapping program requires that a trap be simple, reliable, safe, selective, easy to clean, inexpensive, and capable of catching a multiplicity of mice over extended periods.

With the introduction of modern anticoagulant poisons, rodent plagues are nearly a thing of the past. Poisons, however, do not descriminate between species, so their use often conflicts with recently introduced state and federal law. The passage of the endangered species act requires control efforts to be more species specific. The introduction of state "integrated pest management policies" necessitate the use of mechanical, non-poisonous means to control rodents.

Two mechanical, multiple catch traps currently available are the Kness "ketch-all" (U.S. Pat. No. 2,433,913), and the Victor "tin-cat" (no patent). Significant differences in construction and operation prohibit lengthy comparisons between these models and the present invention. However, a great many lessons were learned that can be applied to an analysis of the prior art. None of the relevant prior art is currently in production.

Several types of multiple catch mouse traps have been proposed—for example, the following U.S. patents: U.S. Pat. No. 956, 38 to McAleer (1910), U.S. Pat. No. 1,040,329 to Holt (1912), U.S. Pat. No. 1,163,071 to Drum (1915), U.S. Pat. No. 1,168,252 to Erdley (1916), U.S. Pat. No. 1,618,513 to Coghill (1927), U.S. Pat. No. 1,667,048 to Rawlings (1928), U.S. Pat. No. 1,716,196 to Swanson (1929), U.S. Pat. No. 2,126,512 to Stemen (1938), U.S. Pat. No. 2,162,623 to Livingston (1939), U.S. Pat. No. 3,872,619 to McIlwain (1975) and U.S. Pat. No. 4,214,399 to Bradley (1980).

Though the preceeding patents have contributed significantly to the developement of multiple catch mouse traps, they nevertheless, suffer from a number of disadvantages:

(a) With the exception of Coghill (1927) who uses mason jars, and Bradley (1980) who uses fifty-five gallon oil drums, the prior art necessitates the manufacture of a container to house the captured mice. The present invention uses standard, commercially available containers, such as five gallon plastic buckets and lids, or the like.

(b) None of the aforementioned patents employ more than one kind of entrance aperture emptying directly into the main trap body. The simple, open apertures disclosed by Holt (1912), Drum (1915), Erdley (1916), Swanson (1929), Stemen (1938), and McIlwain (1975), have no additional entrance apertures with one-way passage devices, should an investigating mouse not be inclined to jump into their traps.

(c) none of the aforementioned patents are provided with reduction rings to quickly increase or decrease the inside diameter of the entrance apertures. The present invention enables the operator to include or exclude various rodent species, providing for a selective catch.

(d) With the exception of McAleer (1910), Drum (1915), and Rawlings (1928), baiting is limited to the main trap body. No additional baiters are provided near, around, or within the entrance apertures. The present invention includes an additional baiter within the entrance aperture proper.

(e) None of the aforementioned patents are as quickly and easily inspected, baited or cleaned as the present invention. The importance of servicing multiple catch traps quickly cannot be overstated. Often, the decision to use poisons is based on expediency alone.

(f) Holt (1912), Coghill (1927), Livingston (1939), and Bradley (1980), disclose one-way passage devices that are assessible to trapped rodents. The accessibility of one-way passage devices to trapped rodents creates opportunity for the devices to be manipulated by live rodents, or obstructed by dead and dying rodents, particularly if they become impailed on prongs. The present invention widely separates the trapped rodents from the entrance apertures.

(g) McAleer (1910), Coghill (1927), Rawlings (1928), Swanson (1929), Livingston (1939), and Bradley (1980), disclose entrance apertures provided with sharpened prongs that may be a hazard to children and pets. The prongs are intended to discourage or injure mice attempting to escape. In addition, the baited prongs described by Swanson (1929), are exposed, so that the bait would be easily removed by larger non-target species.

The present invention does not possess sharpened prongs, thus captured mice are not injured before being live released.

(h) Holt (1912), and Coghill (1927), fail to recognize that due to the proximity of captured mice to the one-way passage devices, as additional mice enter, the captured mice may escape. This is likely, since mice travel in family groups. Mother and juveniles are often trapped together.

(i) Bradley (1980), discloses an elbow shaped tubular entrance aperature terminating in a series of sharpened prongs. Each prong is guided by a single guide slot that allows unrestricted upward motion, and thus, the passage of a rodent into the main body of the trap. Exit is not possible, since an attempt to do so would result in being impailed on the prongs.

Two shortcomings of this arrangement are: (1) The guide slots guide only the heads and necks of the prongs. This creates noticeable side swing at the foot end of the prongs. (2) The guide slots do not limit the upward motion of the prongs. This arrangement may lead to manipulation by mice from above and behind the prongs.

(j) McIlwain (1975), discloses a trap system that includes a first container inside a second container. This trap, however, must be buried in the ground., The extra effort of installing this apparatus dramatically increases cost and consequently reduces its efficiency.

(h) The trap described by Stemen (1938), is poorly ventilated.

OBJECTS AND ADVANTAGES

Accordingly, besides the objects and advantages of the multiple catch mouse trap described in my above patent, several objects and advantages of the present invention are:

(a) to provide a multiple catch mouse trap with a plurality of entrance aperture tubes, including at least one, one-way passage device.

(b) to provide an additional bait compartment that: (1) lures mice past a one-way passage device and (2) insures an uninterrupted supply of bait.

(c) to provide reduction rings that allow for the adjustment of the inside diameters of the entrance aperture tubes.

(d) to provide a multiple catch mouse trap that utilizes ordinary five gallon plastic buckets and lids.

(e) to provide for the separation of the entrance aperture tubes from captured mice.

(f) to provide a durable, rust proof, long lived trap body and lid.

(g) to provide for easy carrying and handling.

(h) to provide for a large catch size.

(i) to provide for the humane treatment of captured mice.

(j) to provide for rapid inspection, cleaning, and baiting.

(k) to provide a consumer friendly trap that does not require the use of poison, sharp edges, or prongs.

(l) to provide for simple, long term control of climbing rodents.

DRAWING FIGURES

In the drawings, closely related figures have the same number but different alphabetic suffixes.

| Referance Numerals In Drawing | |
|---|---|
| 2 | lid |
| 4 | container |
| 6 | holes |
| 8 | entrance aperture tubes |
| 8a | one-way passage |
| 8b | simple, open |
| 8c | simple, open |
| 10 | reduction rings |
| 10a | slotted |
| 10b | unslotted |
| 12 | annular groove |
| 14 | support post |
| 16 | one-way passage device |
| 16a | guide posts |
| 16b | guide slot |
| 16c | cotter key |
| 16d | support rod |
| 16e | support rod insert hole |
| 18 | bait compartment |
| 20 | bait compartment cap |

DESCRIPTION—FIGS. 1 to 5

Figure 1:
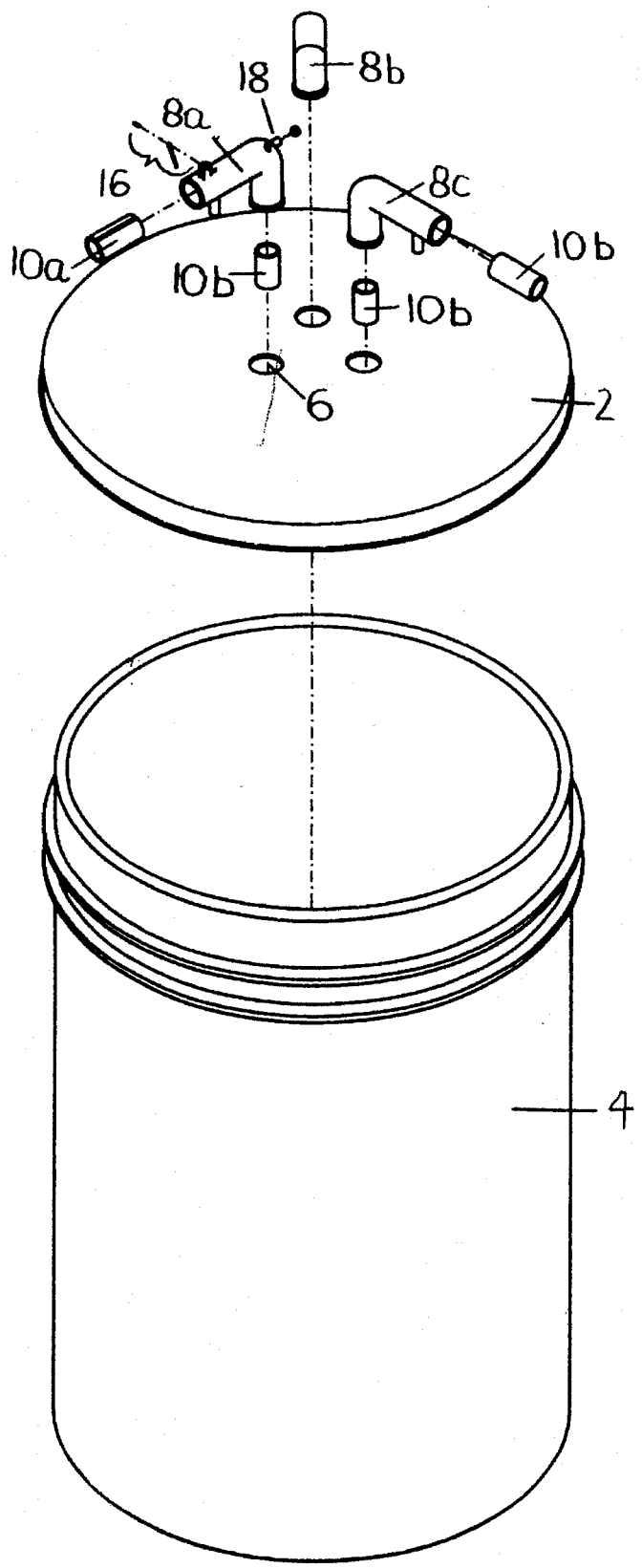
FIG. 1 shows an exploded view of the entire trap assemblage.
Figure 2:
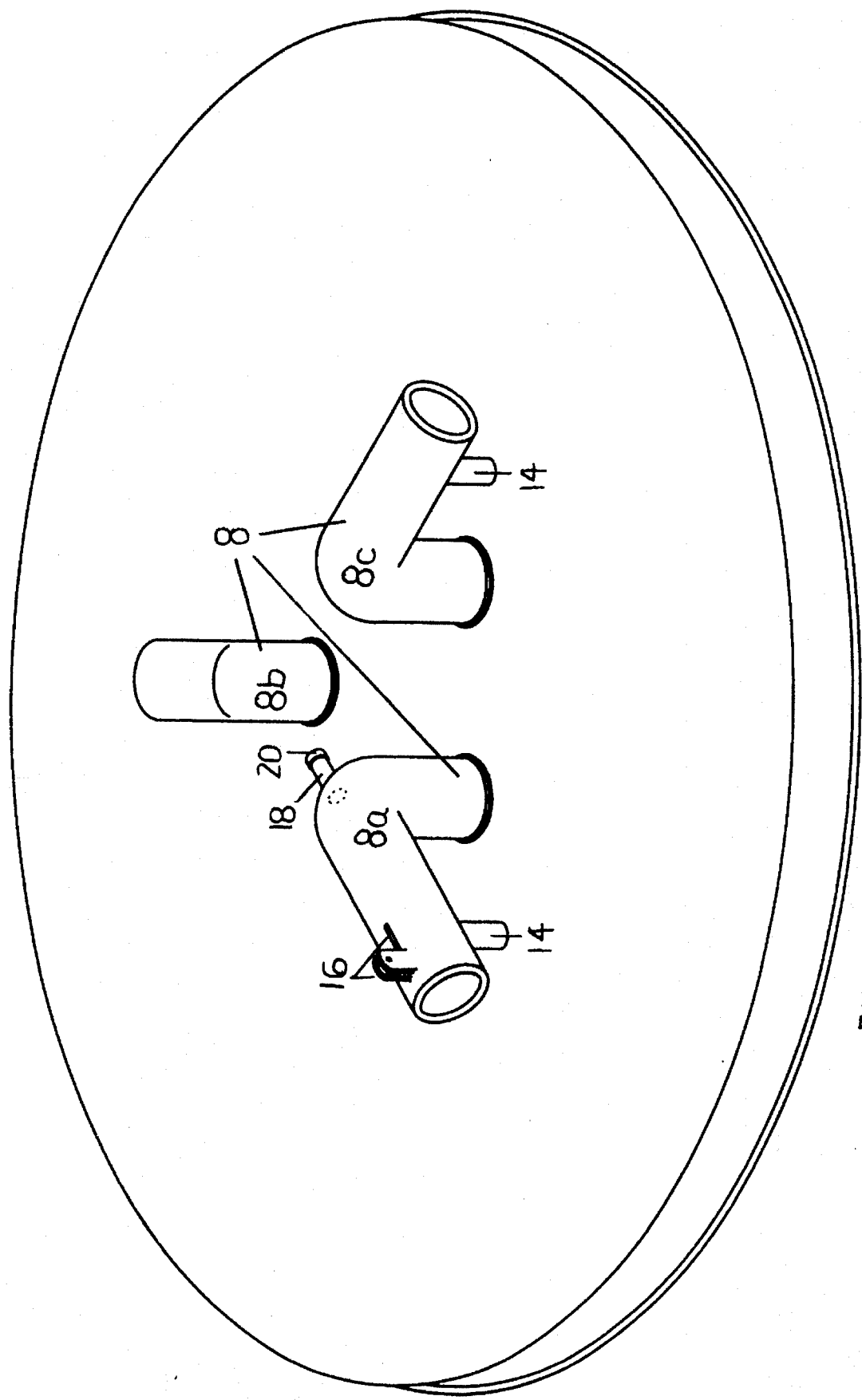
FIG. 2 shows a perspective view of the trap lid and entrance aperture tubes without the reduction rings in place.

A typical embodiment of the present invention is illustrated in FIG. 1 (exploded view of the entire trap assemblage) and FIG. 2 (perspective view of lid). Referring to FIG. 1, there is a lid 2 that snaps onto a cylindrical container 4 as for example a five gallon plastic bucket and lid or the like. It will be appreciated that the lid 2, and the container 4, are standard commercially available products.

Figure 3:
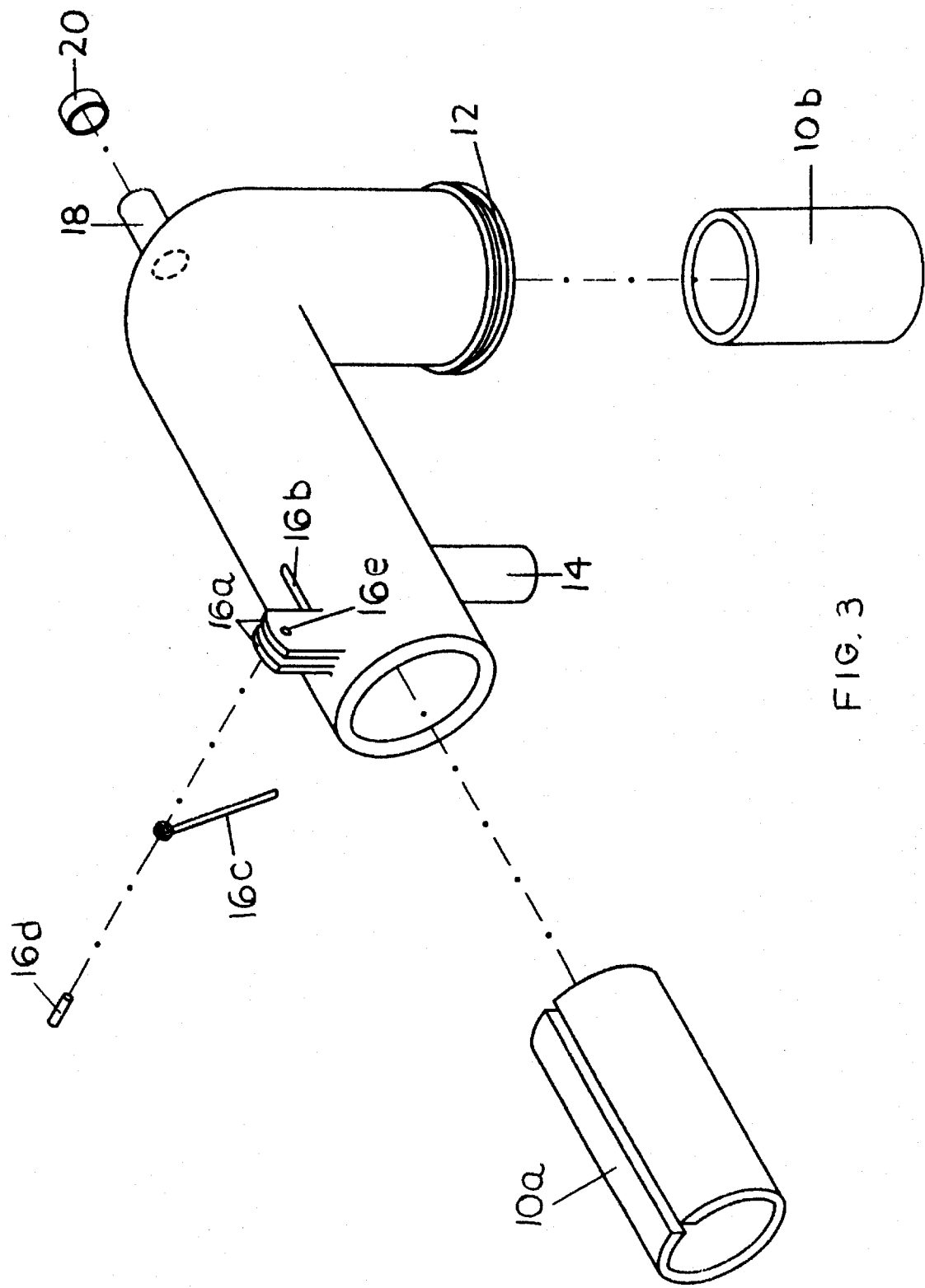
FIG. 3 shows an exploded view of an entrance aperture tubes with a one-way passage device, bait compartment, and reduction rings.
Figure 5:
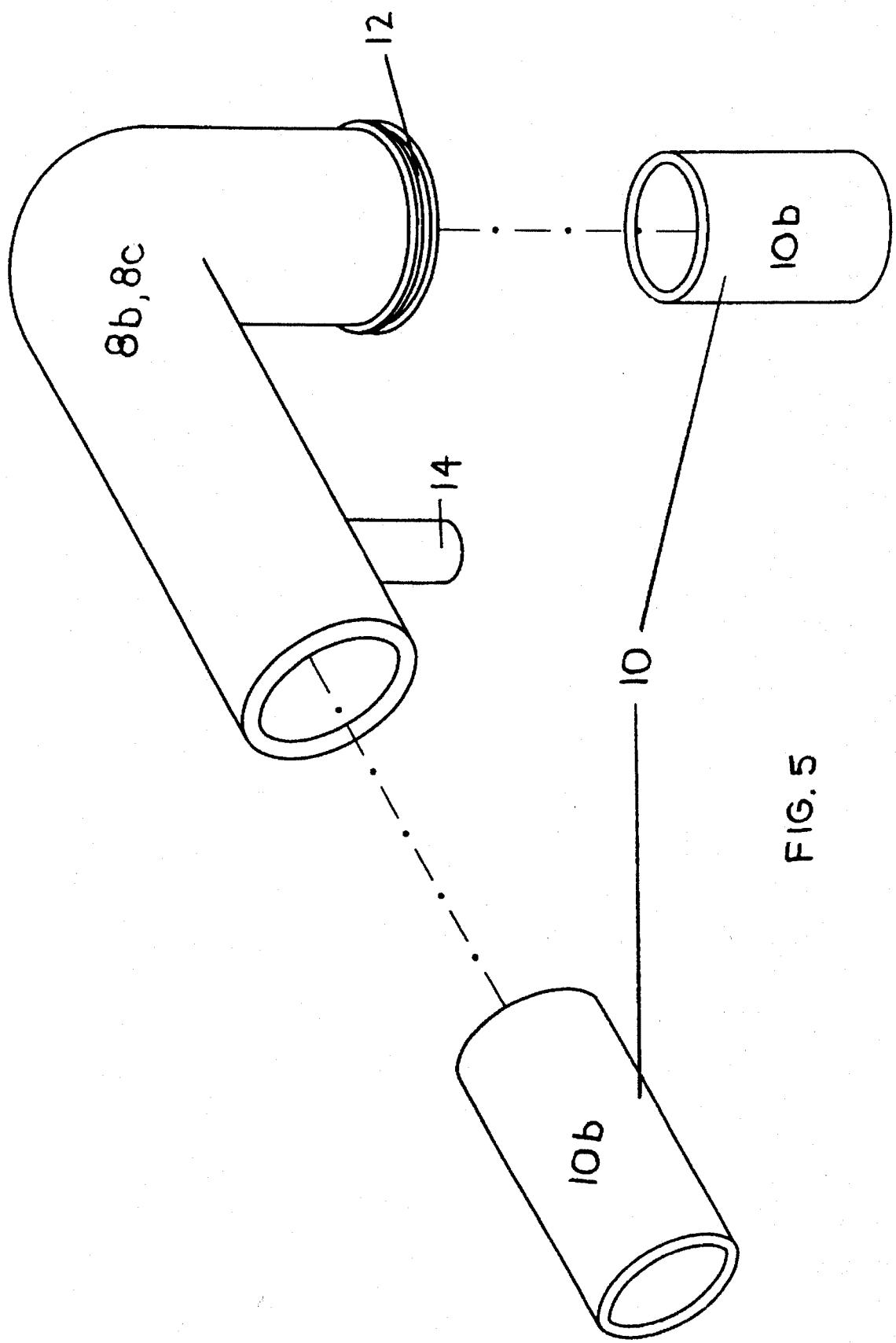
FIG. 5 shows an exploded view of a simple, open entrance aperture tubes reduction rings.

Clearly illustrated in FIGS. 3, 5, a plurality of hollow, elbow shaped entrance aperture tubes 8 are attached to the lid 2 by fitting an annular groove 12, at the base of each entrance aperture tube 8 into the holes 6 bored in a triangular pattern toward the center of the lid 2. The entrance apertures tubes 8 are made of hard plastic or sheet metal and radiate 120 degrees from center. The annular groove 12 provides a snug fit, yet allows the entrance apertures tubes 8 to swivel so that alternate positions are possible. Each entrance aperture tube 8 rests on a support post 14.

Shown clearly in FIGS. 3, 5, the entrance apertures tubes 8 are of two types. Entrance aperture tube 8a possesses a one-way passage device 16 and a bait compartment 18. Entrance aperture tubes 8b,8c are simple, open aperture tubes.

Figure 4:
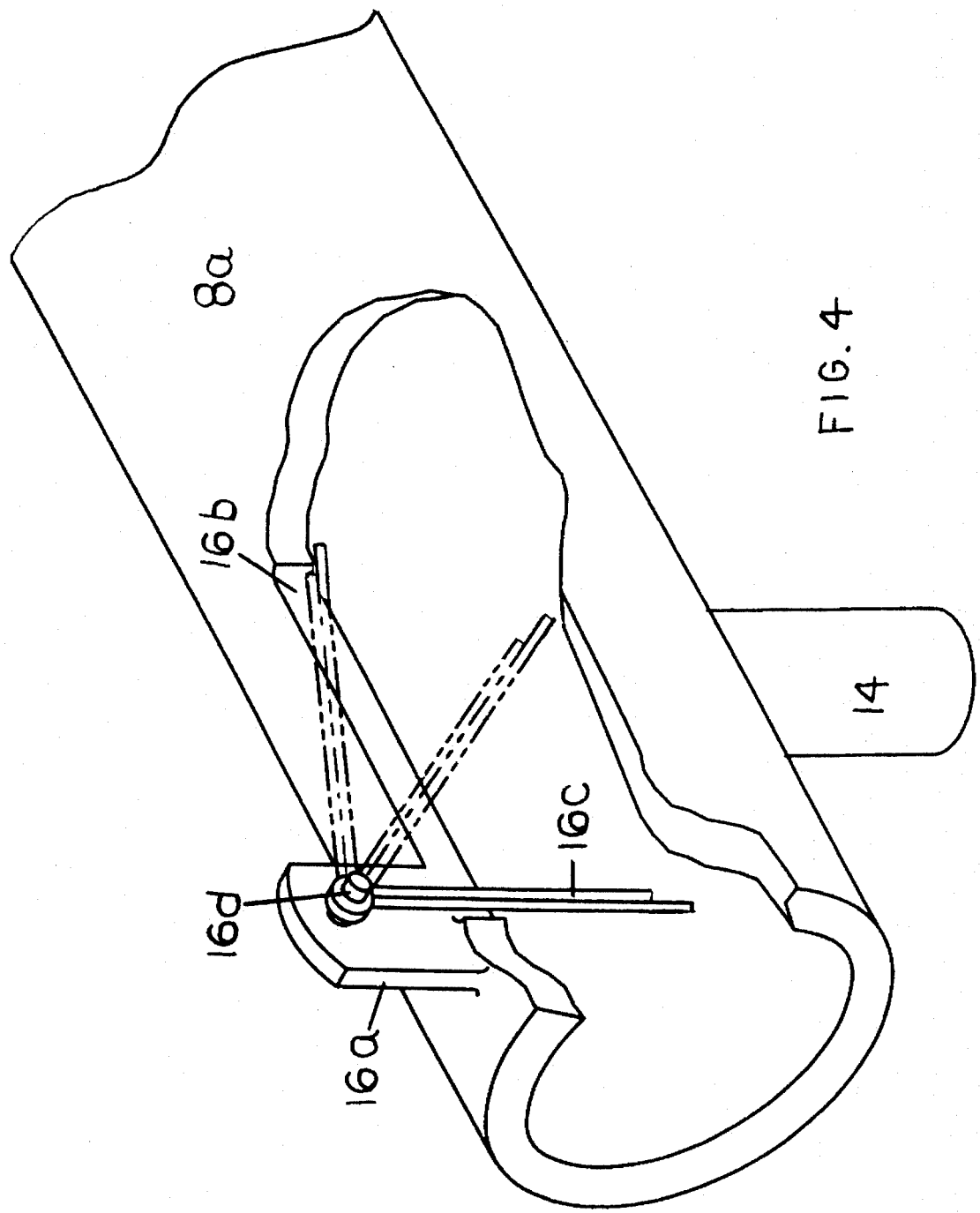
FIG. 4 shows a cutaway view of the one-way passage device.

Entrance aperture tube 8a, illustrated in detail in FIG. 3 (exploded view) and FIG. 4 (cutaway view) is provided with a one-way passage device 16. The one-way passage device 16 is comprised of guide posts 16a that arise adjacent to the guide slot 16b. The guide posts 16a are provided with holes 16e through which a support rod 16d is fitted. A cotter key 16c is loosely attached to the support rod 16d and is suspended between the guide posts 16a, through the guide slot 16b, and into the entrance aperture. tube 8a. The cotter key 16c divides entrance aperture tube 8a, near its origin, into two halves when the cotter key 16c is at rest. The cotter key 16c is made of a light metal, or rigid plastic, and is blunt. Backward motion of the cotter key 16c is prohibited by the posterior end of the guide slot 16b. Forward motion of the cotter key 16c is permitted since the body of the cotter key 16c swings up and into the guide slot 16b. However, FIG. 4 clearly shows that the tip of the cotter key 16c does not pass into the guide slot 16b, and thus does not become lodged, or flipped up and out of the guide slot 16b. The guide posts 16a and the guide slot 16b are sufficiently wide to permit free motion of the cotter key 16c forward and backward, but not wide enough to allow appreciable side-swing. Suspending the cotter key 16c between the guide posts 16a and through the guide slot 16b insures direct center of the cotter key 16c within entrance aperture tube 8a.

Reduction rings 10 are pressed into the entrance aperture tubes 8 when it is desired to limit the catch to a smaller mouse species. Reduction ring 10a is slotted to accomodate the motion of the cotter key 16c and is marginally wider than the guide slot 16b to insure free movement of the cotter key 16c.

Entrance aperture tube 8a is also provided with a bait compartment 18 that opens into but does not protrude into entrance aperture tube 8a. The bait compartment 18 is provided with a cap 20.

Entrance aperture tubes 8b,8c are provided with simple, unslotted reduction rings 10b.

OPERATION—FIGS. 1 to 5

Two inches of sunflower seed (or its equivalent) are spread in the bottom of the container 4. The cap 20 is removed from the bait compartment 18 and peanut butter (or its equivalent) is pressed into the bait compartment 18. The cap 20 is then replaced. The majority of the bait in the bait compartment 18 is not accessible to investigating mice.

An object one half the height of a standard five gallon container 4 is placed next to the container 4. Jumping mice will gain access to the lid 2 in this manner. Leaning a board from ground level to the lid 2 allows climbing and jumping mice to gain access to the lid 2. In either event, when the lid 2 is gained, the mice investigate the entrance aperture tubes 8 to determine the accessibility of the bait.

The majority of mice enter the container 4 through the simple, open aperture tubes 8b,8c. Some mice, however, are not as readily captured, and must be compelled to jump into the trap.

During the investigative process, the mice often peer into into the container 4 through an open aperture tubes 8b,8c, only to back out and peer down the other open aperature tube 8b,8c. At any point in the investigation a mouse may enter aperture tube 8a. Each time a mouse passes beyond the light, blunt, forward swinging cotter key 16c, the cotter key 16c falls back into the "set" or resting position FIG. 4. The cotter key 16c now resists backward pressure, and the mouse, unable to turn around, is compelled to jump into the container 4 from which it cannot escape. The bait compartment 18 is an additional incentive to enter entrance aperture tube 8a, and insures an uninterrupted supply of fresh bait.

In addition to prohibiting larger mouse species from entering the entrance apertures tubes 8, the reduction rings 10 are pressed into the apertures tubes 8 at both ends to insure that smaller species are unable to turn around.

SUMMARY, RAMIFICATIONS, AND SCOPE

Two years of field testing, and one year of direct observation via monitors, has confirmed the efficiency of the present invention.

The additional compartment baiter insures the presence of uncontaminated bait and provides for long term attraction. Mice continue to enter the trap despite the presence of dead mice, and contaminated container bait.

Captured rodents do not attempt to gnaw through the plastic buckets.

In no instance, has a mouse obstructed an entrance aperture tube. Clearly, what the mice can crawl into, they can crawl out of.

Large containers, such as five gallon plastic buckets, are less stressful to captured mice and allow for very large catch size. Up to fifty mice.

The trap lid, with a plurality of simple, open aperture tubes and one-way passage devices can be adapted for use with trash cans, oil drums, barrels, and other cylindrical containers.

The vertical alignment of the present invention limits the catch to the climbing and jumping species of mice that frequently infest structures. The reduction rings permit further discretion.

Additional aperture tubes may be added to increase the breadth of species captured, for example, the conduit described by Stemen (1938) would extend the reach of an aperture tube to ground level. The reduction rings may be omitted from one aperture tube to increase breadth. Further combination of the open aperture tubes and the one-way passage device are not limited to the combinations described in the above patent. Thus, it may be desirable to use more than one one-way passage device.

It is evident that a plurality of entrance aperture tubes accomplishes the following: 1) They heighten attraction by allowing air to ventilate through the trap, advertising the bait. 2) They excite investigation. 3) They complement each other in the sense that confidence is gained by mice that investigate open aperture tubes before they enter the one way passage device.

Although the description above contains many specificities, those should not be construed as limiting the scope of the invention but as merely providing illustrations of some of the preferred embodiments of this invention.

Thus the scope of the invention should be determined by the appended claims and their legal equivalents, rather than by the examples given.

I claim:

1. A device for trapping a multiplicity of live mice comprising:

a horizontally positioned lid, adapted for use with vertically aligned container means of sufficient depth to retain mice, said lid having at least one hole suitable for the insertion of at least one hollow, elbow shaped aperture tube enabling the passage of said mice into said container means;

at least one hollow, elbow shaped aperture tube having an inside diameter, and each of said at least one aperture tube inserted in a respective one of said at least one hole;

a one way passage device comprising a cotter key, horizontally, vertically, and laterally guided by two guide posts and a guide slot in one of said at least one aperture tube, said cotter key being pivotally suspended between said guide posts and through said guide slot, said cotter key being limited in its pivotal motion by said guide slot, said cotter key diametrically disposed in said one of said at least one aperture tube;

a bait compartment attached to said one of said at least one aperture tube, so as to lure said mice past said one way passage device; and, at least one reduction ring adapted to decrease the inside diameter of one of said at least one aperture tube.

2. The trapping device of claim 1 wherein said lid is sized for use with a standard five gallon plastic bucket.

3. A device for trapping a multiplicity of rodents comprising:

a horizontally positioned lid, adapted for use with vertically aligned container means of sufficient depth to retain said rodents, said lid having a hole;

a hollow, elbow shaped aperture tube having an inside diameter, said aperture tube inserted in said hole enabling the passage of mice into said container means;

a one way passage device comprising a cotter key, horizontally, vertically, and laterally guided by at least one post and a guide slot said aperture tube, said cotter key being pivotally suspended between said at least one post and through said guide slot, said cotter key being limited in its pivotal motion by said guide slot, said cotter key disposed said aperture tube; and, a bait compartment attached to said aperture tube so as to lure said rodents past said one way passage device.

4. The device of claim 3, further comprising at least a second hole, and at least a second elbow shaped aperture tube inserted therein.

* * * * *